June 24, 1947.   M. F. HAYES   2,422,896
CLUTCH MECHANISM
Filed April 7, 1945

INVENTOR.
Millard F. Hayes.
BY Walter C. Ross.
Attorney.

Patented June 24, 1947

2,422,896

UNITED STATES PATENT OFFICE 2,422,896

CLUTCH MECHANISM

Millard F. Hayes, Hudson Falls, N. Y., assignor to The Sandy Hill Iron & Brass Works, Hudson Falls, N. Y., a corporation of New York Application April 7, 1945, Serial No. 587,134

5 Claims. (Cl. 192—3.2)

1

This invention relates to improvements in driving mechanisms and more particularly to improvements in clutch construction.

The principal objects of the invention are directed to the provision of clutch mechanism which is characterized by independently operable fluid clutching and friction clutching means for connecting driving and driven shafts in combination with means for operating the same.

The novel features of the invention are adapted for broad application and various changes and modifications may be made within the scope of the invention to adapt it for use wherever desired.

It is ordinary practice to employ a friction clutch in connection with the driving means for various machines and apparatus and in the usual case the starting torque of the machine or apparatus is in excess of the normal operating torque so that a much larger and costlier clutch mechanism is necessary than for normal operating conditions. Also it is desired in many instances to pick up the load gradually which requires clutch capacity in excess of normal. At best there is great wear of the clutch parts and it is expensive in first cost and maintenance.

According to this invention, there is provided a fluid clutch for connecting driving and driven shafts which may be operated so as to slowly take up the load and a friction clutch for making the connection when the driven shaft has attained its operating speed in combination with means for operating said clutches and transferring the load from the fluid to the friction clutch.

Figure 1:
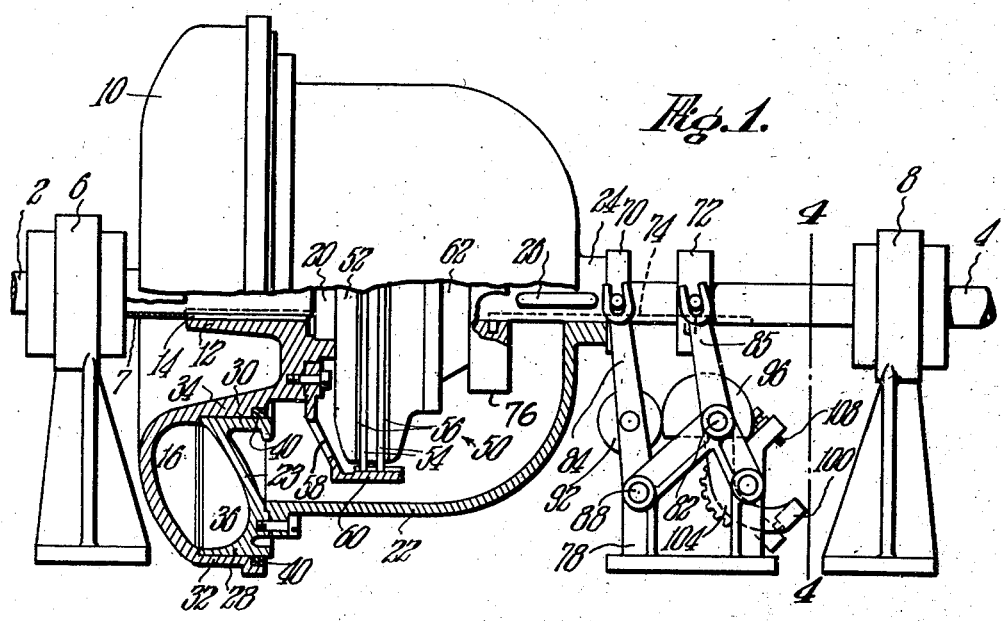
Fig. 1 is a side elevational view of a clutch mechanism embodying the novel features of the invention.
Figure 5:
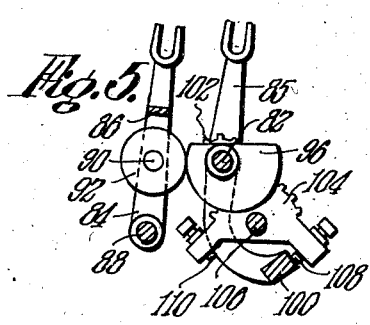
Fig. 5 is an elevational view of the operating mechanism.
Figure 4:
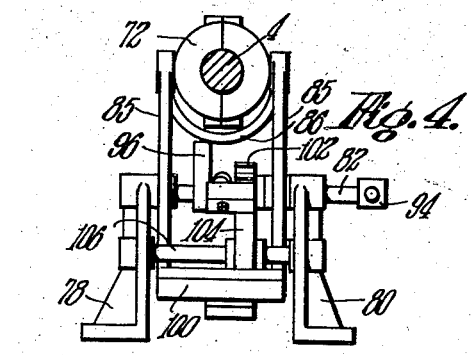
Fig. 4 is an elevational sectional view on the line 4—4 of Fig. 1.
Figures 2, 3:
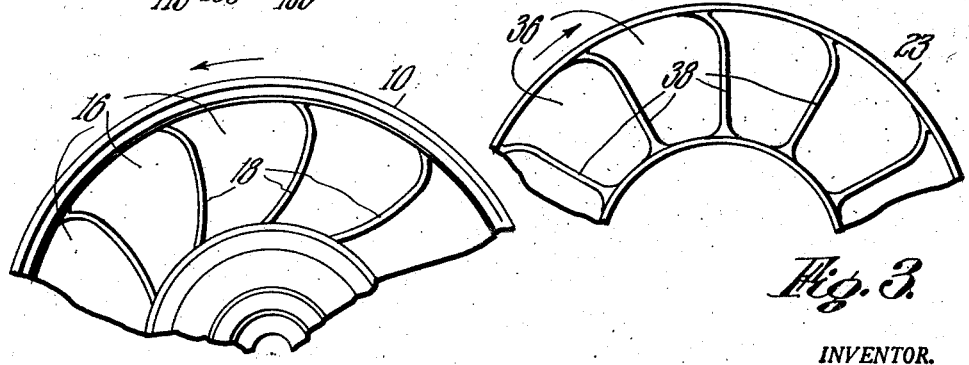
Figs. 2 and 3 are partial face views of the cooperating driver and runner of the mechanism shown in Fig. 1.

Referring now to the drawings more in detail, the invention will be fully described.

Separate driving and driven shafts are shown at 2 and 4 which are journalled in bearings 6 and 8. The driving shaft may be operated from any suitable source of power and the driven shaft may be connected by any suitable means to such an apparatus or machine as it is desired to drive through the clutch mechanism of the invention.

A driver member 10 has a hub part 12 fixed to the driving shaft 2 by any suitable means,

2 such as a key 14. The inner face of the driver is provided with a plurality of pockets 16 formed by partitions 18.

The inner end of the driven shaft 4 is journalled in the drive member 10 by means of an anti-friction bearing 20. A housing member 22 has a hub part 24 slidable on shaft 4 and in sliding engagement with a key 26 of said shaft and is secured to a runner member 23, as shown.

Inner portions 28 and 30 of the member 23 are guided for sliding movements in portions 32 and 34 of the member 10 to facilitate movements of the said member 23 towards and away from the member 10 between clutching and non-clutching position.

The inner face of the member 23 is provided with pockets 36 formed by partitions 38. Packings 40 are provided, as shown, which may be of any suitable material to seal the relatively movable surfaces of the members 10 and 23.

A liquid suitable for the purpose and which may be oil or the like is carried by the pockets so that as the member 10 rotates the member 23 and thereby shaft 4 is driven at relatively more or less speed depending upon the clutching relation of the members 10 and 23. The parts may be arranged so that when the members 23 and 10 are separated the greatest distance, the member 23 remains stationary while as the member 23 is moved towards or into the member 10 the member 23 is rotated. There may be slippage of the members 10 and 23 so that the member 23 is rotated at a less speed than that of member 10 until the member 23 is in maximum clutching relation with the member 10.

In this way, the speed of the shaft 4 may be accelerated from zero to maximum so as to inch in the mechanism to be driven.

With a friction clutch where a load is being taken up, there is not only excessive wear of the frictionally engaged parts but the capacity of the clutch must be greatly in excess of that required for the normal load. With the clutch mechanism described frictionally engaged parts are eliminated.

Movements of the member 22 are accomplished by means later to be described.

A friction clutch is represented by 50 and may be of usual form having a central member 52 fixed to the driven shaft 4 and friction plates 54 and 56. A spider 58 is secured to the member 10 as shown and has a peripheral ring 60. Certain of the friction plates have peripheral lugs disposed in grooves of the ring 60 and a pressure member 62 is movable on the shaft 4 between a non-clutching position and the clutching position shown wherein the plates and central member are forced into frictional clutching engagement so that the driven shaft 4 is driven from the member 10 through the clutch 50.

In the position of the parts shown in Fig. 1, the hydraulic clutch and the friction clutch are both in clutching position having been brought to that position by the means now to be described.

Collars 70 and 72 are slidable on shaft 4 the former of which as it moves forwardly from a non-clutching position at the right of that shown and to the left acts on the member 22 to move the member 23 into the driver 10 to bring about clutching action of the members 10 and 22 through the fluid in the pockets thereof.

The collar 72 is connected, by a draw-key 74 slidable in a groove provided in shaft 4, to a collar 76 slidable on said shaft which as it moves to clutching position, to the left from the position shown, forces the friction clutch parts into clutching engagement.

Brackets 78 and 80 are provided in which is a rotatable cam shaft 82. A pair of levers 84 are connected in spaced relation by a transverse member 86 and are swingable on a shaft 88 extending between the brackets. A transverse shaft 90 therebetween carries a roller 92.

The cam shaft 82 has a manually engageable member 94 fixed thereto and a cam 96 fixed on said shaft is adapted to act on the roller 92. The cam 96 is formed so that when shaft 82 is rotated clockwise from non-clutching position of the member 22, the cam acts on the roller 92 to swing lever 84 to the left for acting on the collar 70 and bring members 10 and 22 in full clutching relation shown in Fig. 1. As the shaft 82 is rotated counterclockwise from the position shown, the member 22 may move to non-clutching position.

The lever 85 has side parts as shown that swing on shaft 82 and the lower ends thereof are connected by a transverse member 100. A pinion 102 fixed to the cam shaft 82 is in mesh with a quadrant 104 oscillatable on a shaft 106 extending between brackets 78 and 80. Said quadrant is provided with adjusting screws 108 and 110 adapted to abut part 100 for swinging lever 85.

As shaft 82 is rotated counterclockwise with the parts in the position shown in Fig. 1 the cam allows the lever 84 to swing to the right so the member 22 moves to non-clutching position and subsequently the quadrant is rotated so that screw 108 abuts lever part 100 to swing lever 85 to the right into non-clutching position.

The mechanism is adapted and arranged so that shaft 82 may be rotated from non-clutching position to swing lever 84 to the left and bring the members 10 and 23 gradually into full clutching relation thereby to pick up the load gradually and bring the speed of the shaft 4 up to that of the driving shaft 2. When the members 10 and 23 are in full clutching relation the continued rotation of shaft 2 brings about movement of lever 85 so that the friction clutch is in operation.

Thus the starting torque is taken through the hydraulic clutch and when the shaft 4 is up to speed the friction clutch may take control.

The pockets 16 and 36 are so formed and arranged that in the operation of the mechanism when the driven member is being driven by the driver, the liquid moves from a high pressure area to a low pressure area and back to a high pressure area for the most efficient operation.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A clutch construction comprising in combination, a drive member provided with fluid clutch forming pockets and having friction clutch means associated therewith, a first driven member having clutch forming pockets thereon and being movable towards said drive member into clutching position with the pockets thereof cooperating with those of the drive member and away therefrom, and a second driven member having friction clutch means thereon and being movable independently of the first driven member towards said drive member into clutching position with the clutch means thereof cooperating with the clutch means of the drive member and away therefrom.

2. A clutch construction comprising in combination, a drive member provided with fluid clutch forming pockets and having friction clutch means associated therewith, a first driven member having clutch forming pockets thereon and being movable in one direction towards said drive member into clutching position with the pockets thereof cooperating with those of the drive member and in an opposite direction away therefrom, and a second driven member having friction clutch means thereon and being movable independently of the said first driven member towards said driven member in said one direction into clutching position with the clutch means thereof cooperating with the clutch means of the drive member.

3. A clutch construction comprising in combination, a drive member provided with fluid clutch forming pockets and having friction clutch means associated therewith, a first driven member having clutch forming pockets thereon and being movable in one direction towards said drive member into clutching position with the pockets thereof cooperating with those of the drive member and in an opposite direction away therefrom, and a second driven member having friction clutch means thereon and being movable independently of the said first driven member towards said driven member in said one direction into clutching position with the clutch means thereof cooperating with the clutch means of the drive member, and operating means operably connected to said driven members arranged and adapted to successively move said first and second driven members in said one direction into clutching position.

4. A clutch construction comprising in combination, a drive member rotatable on a certain axis provided with fluid clutch forming pockets and having friction clutch means associated therewith, a driven shaft rotatable on the axis of rotation of said drive member, a first driven member having clutch forming pockets thereon and being movable in one direction on said driven shaft towards said drive member into clutching position with the pockets thereof cooperating with those of the drive member, and a second driven member having friction clutch means thereon and being movable on said driven shaft in said one direction into clutching position with the clutch means thereof cooperating with the clutch means of the drive member, said driven members being non-rotatable relative to said driven shaft.

5. A clutch construction comprising in combination, a drive member rotatable on a certain axis provided with fluid clutch forming pockets and having friction clutch means associated therewith, a driven shaft rotatable on the axis of rotation of said drive member, a first driven member having clutch forming pockets thereon and being movable in one direction on said driven shaft towards said drive member into clutching position with the pockets thereof cooperating with those of the drive member, and a second driven member having friction clutch means thereon and being movable on said driven shaft in said one direction into clutching position with the clutch means thereof cooperating with the clutch means of the drive member, said driven members being non-rotatable relative to said driven shaft, and operating means operably connected to said driven members arranged and adapted to move said driven members successively in said one direction.

MILLARD F. HAYES.

REFERENCES CITED

The following references are of record in the file of this patent:

UNITED STATES PATENTS

| Number | Name | Date |
|---|---|---|
| 1,551,055 | Rieseler | Aug. 25, 1925 |
| 2,129,366 | Sennes | Sept. 6, 1938 |
| 2,130,895 | Ness | Sept. 20, 1938 |